March 8, 1938.  R. W. NELSON  2,110,308
DEVICE FOR TREATING THERMOMETERS IN HOSPITALS
Filed Feb. 11, 1936  2 Sheets-Sheet 1
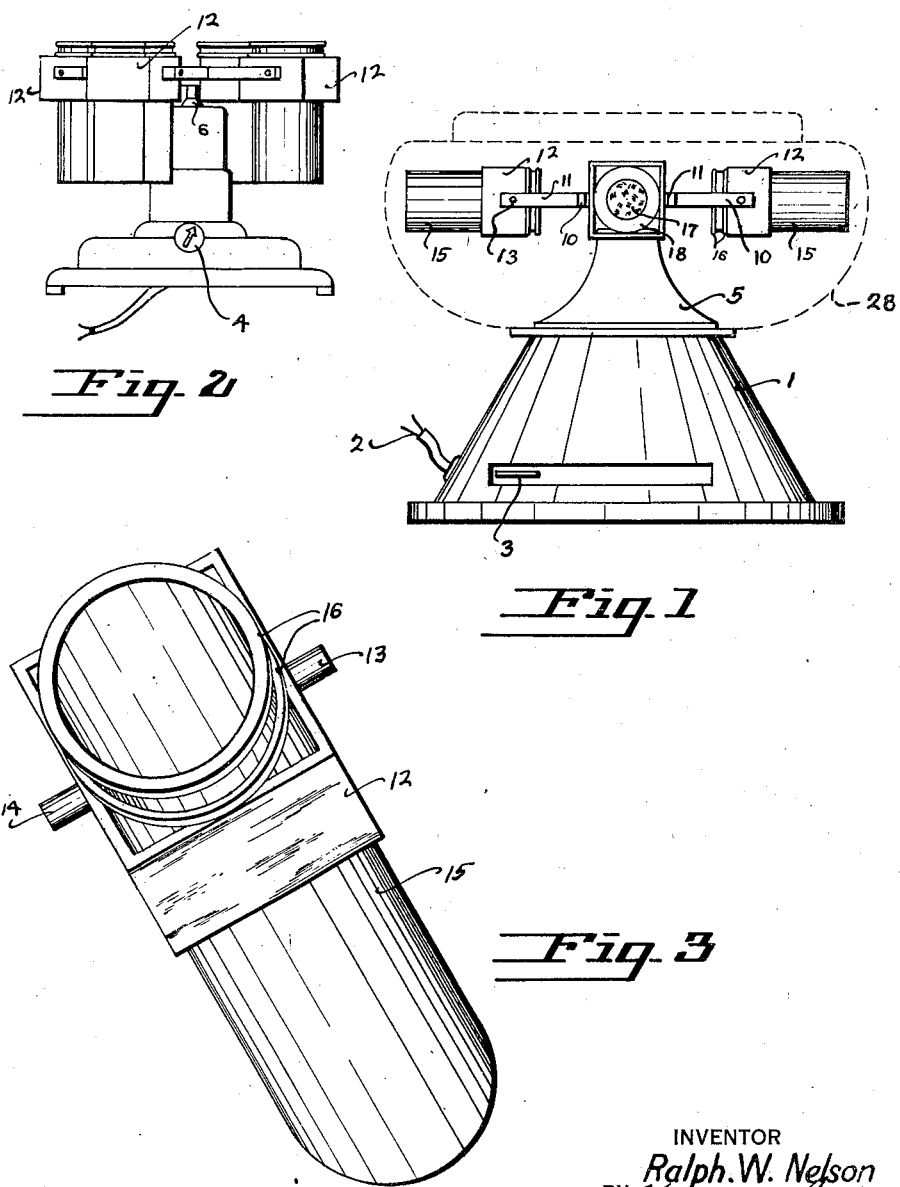
INVENTOR
Ralph. W. Nelson
BY
ATTORNEY March 8, 1938.     R. W. NELSON     2,110,308
DEVICE FOR TREATING THERMOMETERS IN HOSPITALS
Filed Feb. 11, 1936     2 Sheets-Sheet 2
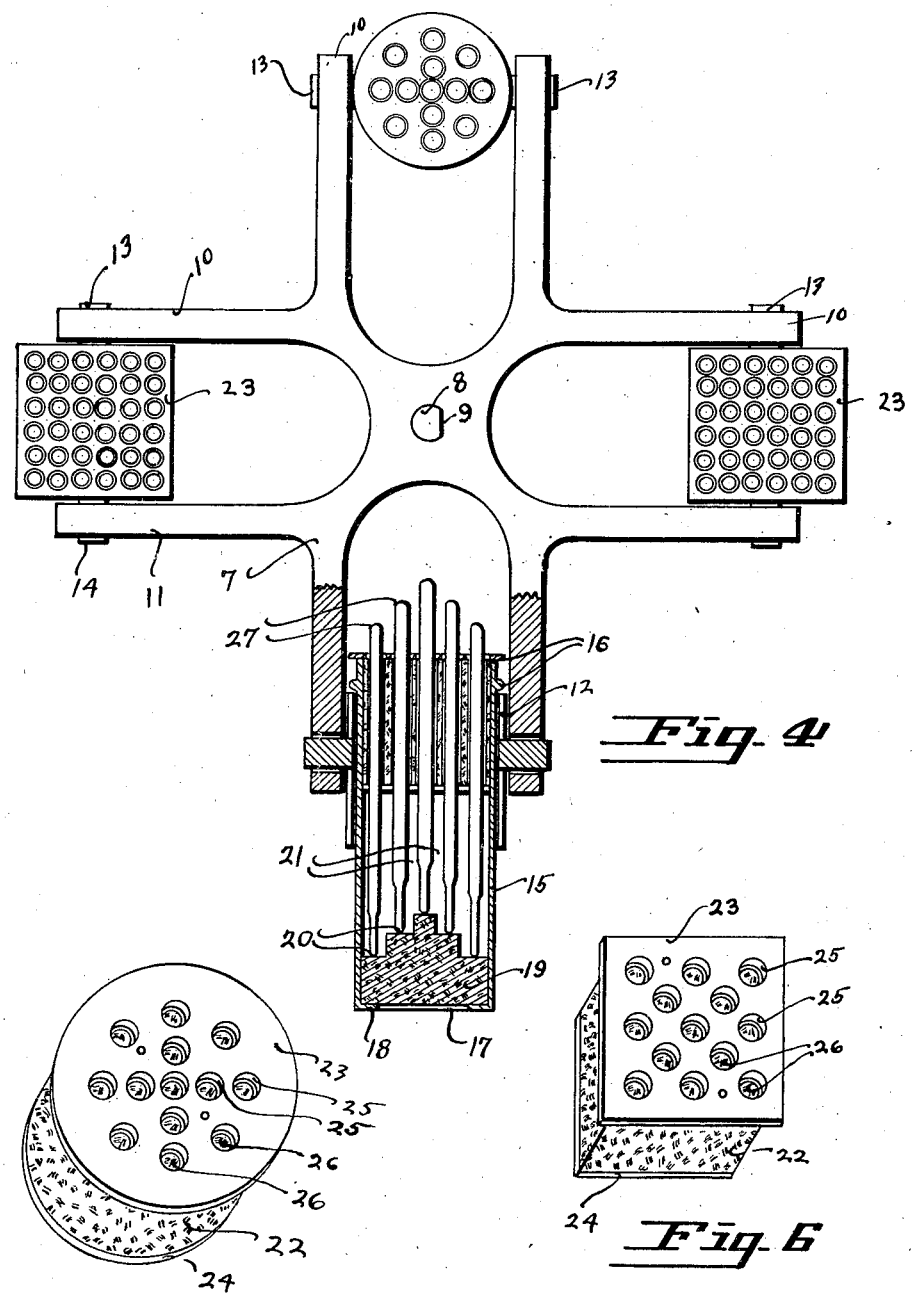

Patented Mar. 8, 1938

2,110,308

UNITED STATES PATENT OFFICE 2,110,308

DEVICE FOR TREATING THERMOMETERS IN HOSPITALS

Ralph W. Nelson, Portland, Oreg.

Application February 11, 1936, Serial No. 63,466

7 Claims. (Cl. 73—373)

Heretofore it has been the general custom in hospitals for the nurse to shake down the thermometer by hand taking one thermometer in her hand at a time and violently shaking the same in order that the mercury will flow from the stem of the thermometer into the bulb. This has been a laborious and a time taking operation. This system also required that the nurse take the thermometer in her hand many times after the same had been sterilized and shake down the same which subjected the thermometer to contamination.

In the larger hospitals where a relatively large number of thermometers are being used and where the rounds of a single nurse required taking the temperatures of all of the patients within a ward or section of the hospital at stated intervals, required considerable time. Through the use of my new and improved device I shake down all of the thermometers that are required for taking the temperatures of the total number of patients in a ward or a section of the hospital at one time.

I provide a holder for the thermometer that is adapted for being placed within a sterilizing solution or agent where the thermometers are all completely immersed within the sterilizing solution in which operation they are maintained in an orderly manner in a holder. After they have been completely sterilized the holder is then placed within a machine and where all of the thermometers are shaken down simultaneously all of the thermometers are then ready for use in the taking of temperatures and none of the thermometers are subjected to coming in contact with the hands of the nurse excepting the very tip of the thermometers.

As the nurse proceeds on her rounds of temperature taking the thermometers are taken from the holder which has been sterilized to thereby prevent any possibility of any of the thermometers that have been used contaminating any of the thermometers that are to be used in the rounds of the nurse taking temperatures of the patients in the ward or section of the hospital. The holders are made of a barrel like shell having a finger or hand engaging corrugated rim disposed on its upper end, the rim having ledges outwardly extending near its top end which locates the holder or shell within the thimble of the machine in which the thermometers are to be shaken down.

A removable cushioning bottom is disposed within the base of the shell which is pyramidal in cross section in order that the different tiers of the thermometers placed within the holding shell will form a like pyramidal top to thereby permit the handling of the thermometers to remove the thermometers from the holder by engaging the upper tip only of the thermometer that is to be used.

I have found the cushioning base may be made of cork although other substances may be used. The cushioning base is made freely removable from the shell in order that it may be sterilized by heat as well as by the immersion in the sterilizing solution.

A relatively long guide is placed within the shell through which the thermometers pass. The central portion of this guide is also made of a highly compressible material in order that the thermometers may not be broken in handling.

In order to give greatest flexibility to my new and improved device a removable thimble is placed within the arm of the device that is to be rotated at a high rate of rotation in order that holders of different thermometer capacity may be placed therein.

The primary purpose and object of my invention consists in providing a machine for the shaking down of thermometers in order that the same may be accomplished with a minimum of effort and one in which the breakage of thermometers will be reduced.

A still further object of my invention consists in so constructing the device and handling of the thermometer that thermometers may be used while in a completely sterile condition.

A still further object of my invention consists in so constructing the device that it will be made of a minimum number of parts, one in which the device may be used over a long period of time with practical freedom from mechanical operating annoyance and one which will deliver thermometers for use in a state to be efficiently handled and one in which the thermometer will be in an entirely uncontaminated condition when ready for use.

A still further object of my invention consists in constructing the same so that it will occupy a minimum of space and one that may be portable so that it can be moved from place to place or from desk to desk without in any way interfering with the usefulness of the device.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view of the completely assembled device.

Fig. 2 is a side view of the assembled device with the protecting hood shown removed in order that the inner construction of the device may be shown.

Fig. 3 is a perspective top view of a thimble that is placed within the arm of the device through the use of which thermometer holders of different capacities may be placed within the device and be efficiently shaken down.

Fig. 4 is a plan view of the holder which is used for supporting a plurality of holders in which thermometers are to be placed that are to be shaken down. In this view one of the holders is shown partially rotated to horizontal position in which position the same is shown in section to illustrate the construction of the same and to illustrate the position of the thermometers that are placed therein.

Fig. 5 is a perspective side plan view of the guide that is to be placed within the barrel. This guide and holder is shown circular in plan view.

Fig. 6 is a perspective side plan view of a guide that has opposite parallel sides.

Like reference characters refer to like parts throughout the several views.

In the commercial production of my device I provide a suitable base housing 1. A motor, not here shown, is disposed within the base. The motor preferably being of the vertical type in order that the assembly may be hitched directly to the armature of the motor. In another type it may be found desirable to use a speed reducer with the motor and when so arranged the motor is set horizontal with the base. Electric energy for operating the motor is provided for conducting thereinto an electric conducting circuit wire 2. A suitable resistance is placed within the circuit to predetermine the rate of rotation of the motor. This is accomplished through mechanical means or through the use of a rheostat. When a rheostat is used a suitable lever 3 progressively decreases the resistance as the lever 3 is moved from left to right. In the smaller units a suitable switch button 4 may operate the rheostat mechanism.

A top 5 may be superposed on the base in which a suitable bearing is provided for the shaft 6. The shaft 6 extends upwardly therefrom. A cross arm supporting head 7 that is dynamically balanced, is placeable upon the shaft 6. The cross arm supporting head 7 has a shaft receiving hole 8 extending centrally therethrough and the hole 8 has a uniform diameter for the major portion of its circumference but having a flat portion 9 disposed at one side to facilitate the engagement with the shaft that drives the same with the use of screws or other fastening means. The cross arm supporting head 7 has a plurality of sets of spaced arms 10 and 11 that are disposed at the opposite sides of the cross arm supporting head 7.

A thimble 12 is provided. The thimble 12 has pintle shafts 13 and 14 secured thereto and outwardly extend therefrom and the same extend through the respective arms 10 and 11 to permit the rocking or partial rotation of the thimble 12 therearound. The pintle shafts are journaled within suitable journal bearings that are disposed within the respective arms 10 and 11. The cross arm supporting head 7 is preferably made of a single piece of metal and the same is so finished and fashioned as to be in dynamic balance. The side walls of the thimble 12 are made substantial in length. A shell 15 is provided and adapted for being closely fitted into the thimble 12 and the same is freely removable from the thimble 12.

I place one or more annular rings 16 about the outer upper surface of the shell 15 to facilitate the hand manipulation of the shell 15. A relatively large opening 17 is disposed central of the bottom 18 of the shell 15 and a compressible bottom 19 is disposed within the bottom of the shell 15. The upper surface of the compressible bottom 19 is preferably made pyramidal or is in step formation, as illustrated at 20 in order that the thermometers 21 placed therein will be in step formation upon their upper ends. A positioning and guide holder 22 is placed within the shell 15. The positioning and guide holder has a top 23 and a bottom 24 and the positioning and guide holder 22 is made of any suitable compressible material that is relatively soft. Spaced holes 25 are disposed within the top 23 and similar holes are placed within the bottom 24. The holes disposed within the top and bottom are placed in registry with each other. A similar number of holes 26 are placed within the guide holder 22. To prevent breakage of the thermometers the holes 26 are smaller than the holes 25 in order that the thermometers being placed therein will not come in contact with the top 23 and the bottom 24 which are made of metal or other hard material. The respective holes 25 are arranged so that the thermometers passing therethrough will be positioned and rest directly upon the pyramidal top or upon the steps 20 of the bottom 19.

The thimble 12 may be made square and have parallel sides, as illustrated in Fig. 6, and thermometer holders and guides may be placed therein. When so made the pyramidal top of the bottom 19 would be made to conform to that form of construction.

Where a lesser number of thermometers are to be shaken down at one time the guide and holder may be round as illustrated in Fig. 5. When so made the shell 15 would also be made cylindrical in cross section and the pyramidal top of the bottom 19 would also be made of a series of annular steps.

In order to give my device the greatest flexibility the shells 15 may be made cylindrical in cross section or they may be made square and the thermometer holders and guides may be made square or circular in order that the device will accommodate and carry and be made to precisely hold the approximate number of thermometers that are to be shaken down in a single operation. This is quite necessary as devices of this kind rotate at fairly high rates of rotation and it is necessary not only for the cross arm supporting head to be made in dynamic balance but also in order that the shells and thermometer guides as well as the number of thermometers placed therein may be made to be placed within the device at opposite sides of the cross arm supporting head in order that they may be maintained in approximate dynamic balance.

It is quite necessary at times to recondition the bottom 19 and to dry the same and therefore it should be made to be freely removable from the shell 15. The hole 17 is not only a bleeder hole for the elimination of any foreign matter deposited within the base of the shell but is made relatively large in order to facilitate the removal of the bottom 19. The top and bottom members 23 and 24 are secured together by any suitable fastening means in order that the thermometer holder and guide as a unit, may be also freely removable from the shell 15 for being dehydrated and to facilitate inspection and the maintaining of the shells 15 in a highly sterile condition. The top member 23 should be made to extend over and upon the upper end of the shell 15 in order that the thermometer holder and guide unit may be freely removed from the shell 15.

It will be noted that the upper ends 27 of the thermometers are pyramidal in contour which facilitates the removal of the thermometers one at a time and since the bulb of the thermometer is to be inserted for the determining of the temperature of the patient being waited upon by the nurse it will be noted that it also will be in position to receive the mercurial column therein as the shaking down device is speeded up.

It will also be noted that the upper end of the stem of the thermometer is the only portion of the thermometer that is handled by the nurse and it need not of necessity come in contact with the patient whose temperature is to be taken.

A hood 28 shown in dotted position in Fig. 1 may be utilized for the encasing of the assembly while being used in the shaking down of the thermometer. This protects the device against damage and prevents injury to the nurse or other attendant during the operation.

While the form of mechanism herein shown and described is admirably adapted to fulfill the objects stated, it is to be understood that it is not intended to confine the invention to the embodiment herein shown and described, as it is susceptible of embodiment in various forms, all coming within the scope of the claims which follow.

What I claim is:

1. In a device of the class described, the combination of a holder for the thermometers comprised of a shell, a bleeder hole disposed in the bottom of the shell, a cushioning bottom disposed within the shell, said cushioning bottom being stepped upon its upper surface to form a pyramid, a thermometer guide and holder disposed in the upper end of the shell with said intermediate portion of the thermometer holder and guides made of a highly compressible material and plates disposed at the top and bottom sides of the guide and holder.

2. In a device of the class described, the combination of a cross arm supporting head, a partially cylindrical hole disposed within and central of the head, journal bearings disposed in the outer end of each of the sets of spaced arms, a thimble having pintle shafts associated therewith, said thimble being placed between the spaced arms of the cross arm supporting head, a shell placeable within the thimble and adapted for being held within the thimble, a bleeder hole disposed within the shell, a compressible bottom disposed within the shell and the top end of the said bottom being in stepped formation, a guide holder, said guide holder having thermometer supporting holes extending therethrough and said guide holder being of compressible material and having top and bottom plates associated therewith with holes disposed in said top and bottom plates and being in registry alignment with the holes disposed within the guide holder and said holes in the top and bottom plates being larger in diameter than the holes disposed within the holder, said spaced holes in the guide holder being of a size to precisely fit the outer surface of clinical thermometers and power means for rotating the cross arm supporting head.

3. In a device of the class described, the combination of a shell, said shell having a bottom with a bleeder hole disposed therein and said shell having a plurality of peripheral rings disposed adjacent its top end and outwardly extending therefrom, a stepped compressible gasket disposed within the bottom of the shell and a guide holder disposed within the top of said shell with the guide holder being in spaced relationship with the stepped gasket disposed within the bottom of the shell, a plurality of spaced holes disposed within the guide holder, the longitudinal center line of said holes being parallel with each other and said holes being made to precisely fit clinical thermometers, means for supporting the shell and power means for rotating the supporting means.

4. In a device of the class described, the combination of a shell, a stepped thermometer support disposed in the base of the shell, a thermometer guide having thermometer guiding holes disposed in the top end of the shell, said guiding holes being so shaped as to position thermometers placed therein so that thermometers will be in registry with the steps disposed in the base and means for supporting the shell in a centrifuge machine.

5. In a device of the class described, the combination of a shell, means for positioning a plurality of thermometers within the shell and for maintaining the clinical thermometers in stepped formation on their outer ends relative to the shell and means for supporting the shell in a centrifuge machine.

6. In a device for shaking down clinical thermometers in combination with a centrifugal machine, comprising a shell, means for precisely positioning the thermometers within the shell, means for supporting the thermometers within the shell so that the thermometers will be in annular rings with each ring being stepped relative to the adjacent rings of thermometers and means for supporting the shell within the centrifugal machine.

7. In a device of the class described, the combination of a thermometer holding shell, means for holding like thermometers therein and for supporting thermometers of equal length so the top ends of the thermometers will stand in stepped formation and means for supporting the shell in a centrifuge machine.

RALPH W. NELSON.